United States Patent
Masahiro et al.

(10) Patent No.: US 6,372,062 B1
(45) Date of Patent: Apr. 16, 2002

(54) PROCESS FOR THE PRODUCTION OF A METAL SHEET HAVING A FINE COMPOSITE STRUCTURE AND A METAL SHEET OBTAINED THEREBY

(75) Inventors: Sasaki Masahiro; Seiichi Takeda, both of Sagamihara (JP)

(73) Assignee: Nippon Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/492,139

(22) Filed: Jan. 27, 2000

(51) Int. Cl.$^7$ ............ B32B 15/01; C21D 1/02; C21D 8/02

(52) U.S. Cl. ........ 148/532; 148/534; 148/579; 148/527; 148/529

(58) Field of Search .................. 148/516, 527, 148/529, 530, 532, 534, 512, 559, 579, 645, 648

(56) References Cited

U.S. PATENT DOCUMENTS 4,246,045 A * 1/1981 Ulam ................ 148/512
4,839,242 A    6/1989 Murayama et al.
5,952,112 A    9/1999 Spring

FOREIGN PATENT DOCUMENTS

| EP | 0 634 794 | 1/1985 |
| EP | 0 355 046 | 2/1990 |
| EP | 0 596 133 | 5/1994 |
| EP | 0 672 520 | 9/1995 |
| JP | 4-040969  | 2/1992 |

* cited by examiner

*Primary Examiner*—Roy King
*Assistant Examiner*—Harry D. Wilkins, III
(74) *Attorney, Agent, or Firm*—Wenderoth, Lind & Ponack, LLP

(57) ABSTRACT

A process for the production of a metal sheet having a multi-layered structure and a fine composite structure, which process comprises stacking at least two kinds of thin sheets selected from thin sheets of pure metals and thin sheets of alloys alternately so as to have multiple layers in total, integrating the stacked sheets by circumferential welding or placing the stacked sheets in a steel or stainless steel box to integrate these, and then, bonding all the layers of the integrated sheets metallically by hot rolling, and a metal sheet obtained thereby.

7 Claims, No Drawings

PROCESS FOR THE PRODUCTION OF A METAL SHEET HAVING A FINE COMPOSITE STRUCTURE AND A METAL SHEET OBTAINED THEREBY

FIELD OF THE INVENTION

The present invention relates to a process for the production of a metal sheet having a multi-layered and fine structure which sheet is obtained from at least two kinds of thin sheets of pure metal thin sheets and/or alloy thin sheets as raw materials, and a metal sheet obtained by the above process.

PRIOR ART OF THE INVENTION

A metal sheet and an alloy sheet are required to have various appropriate functions such as strength, magnetism and a thermal expansion coefficient in accordance with uses thereof. Some of metal sheets having a composite structure of different two kinds of metals and alloys satisfy these functions. For example, an alloy obtained by finely mixing a soft alloy with a hard alloy has soft and hard properties in hardness. Further, for obtaining a metal having a desired thermal expansion coefficient, it is sufficient to produce an alloy having a mixed structure of an alloy having a thermal expansion coefficient greater than the desired thermal expansion coefficient and an alloy having a thermal expansion coefficient smaller than the desired thermal expansion coefficient. Magnetic properties can be controlled by the formation of a composite structure. An alloy having two or more phases, like above, is known as a eutectic alloy. However, there is a defect that each phase does not have desired properties or, generally, a two-phase alloy is likely to be cracked by hot rolling. Therefore, sometimes, a desired alloy can not be obtained.

SUMMARY OF THE INVENTION

It is an object of the present invention to provide a process for the production of a new developed metal sheet having desired combining functions.

According to the present invention, there is provided a process for the production of a metal sheet having a multi-layered structure and a fine composite structure, which process comprises stacking at least two kinds of thin sheets selected from pure metal thin sheets and alloy thin sheets alternately so as to have multiple layers, preferably at least ten layers, in total, integrating the stacked sheets by circumferential welding or placing the stacked sheets in a steel or stainless steel box to integrate these, and then, bonding all the layers of the integrated sheets metallically by hot rolling.

According to the present invention, there is further provided a process for the production of a metal sheet having a multi-layered structure and a fine composite structure, which process comprises stacking the metal sheets obtained according to the above production process to have multiple layers, preferably at least ten layers, integrating the stacked metal sheets by circumferential welding or placing the stacked metal sheets in a steel or stainless steel box to integrate these, and then, bonding all the layers of the integrated metal sheets metallically by hot rolling.

According to the present invention, there is still further provided a process for the production of a metal sheet, which process comprises further heat-treating the metal sheet obtained according to any one of the above processes nearly at a lower melting point in the melting points of at least two kinds of the pure metals and the alloys to form a metal sheet having a structure in which particles of a pure metal or alloy phase having a lower melting point are dispersed.

According to the present invention, there is furthermore provided a process for the production of a metal sheet, which process comprises further hot rolling or cold rolling the above-obtained metal sheet having a particle-dispersed structure.

DETAILED DESCRIPTION OF THE INVENTION

The present inventors have made diligent studies on finding a process for the production of a metal sheet which attains the above object, that is, a metal sheet having desired combining functions. As a result, the present inventors have found that at least two kinds of thin sheets selected from thin sheets of pure metals or thin sheets of alloys are alternately stacked and the stacked sheets are bonded by hot rolling, whereby an alloy having desired combining functions can be obtained. The present invention has been completed by the above finding.

The production process of the present invention will be explained hereinafter.

In the present invention, the pure metals and the alloys refer to materials which are available as a thin sheet material. These materials include pure metals such as Fe, Cu, Al, Ti, Ni, Zr, Mo, Nb, Ag, Au and Ta and alloys of these. The alloy includes various steels, stainless steels, copper alloys such as brass, aluminum alloys having a base of Al—Cu, Al—Zn, Al—Si or Al—Mg, nickel alloys having a base of Ni—Cu, Ni—Fe or Ni—Cr, and titanium alloys having a base of Ti—Al—V, Ti—Mn, etc. Further, said thin sheet refers to a sheet having a thickness of 0.1 to 10 mm. In view of availability of the sheet and workability of stacking, it preferably has a thickness of 1 to 5 mm.

The reason why the number of at least two kinds of the pure metal thin sheets and/or the alloy thin sheets to be alternately stacked is preferably at least ten layers is because it is an object to finally produce a material having a multi-layered structure of several hundreds of layers or several thousands of layers in which pure metals and/or alloys are alternately stacked. That is, As the number of at least two kinds of the pure metal thin sheets and/or the alloy thin sheets is increased in the first stacking, the frequency of re-stackings such as a second stacking or a third stacking can be decreased.

In the present invention, the term "bonding all metal layers metallically" means that metals present on the interface of different metal layers are atomically bonded to each other. For example, the above term shows that, on the interface of a pure metal A layer and a pure metal B layer, atoms of the pure metal A and atoms of the pure metal B are mutually mixed.

Metal sheets produced by stacking alternately at least two kinds of pure metal thin sheets and/or alloy thin sheets and hot rolling the stacked sheets, are stacked again and hot rolled, whereby there can be produced a metal sheet having finer layer structure and having finer microstructure.

The properly stacked and hot rolled metal sheet, like above, is cold rolled, whereby there can be produced a metal sheet having further finer layer structure and having finer microstructure.

The metal sheet obtained through the steps of hot rolling and cold rolling is further heat-treated nearly at a lower melting point in the melting points of at least two kinds of the pure metals and the alloys, whereby the finely separating of a pure metal or alloy layer having a lower melting point is advanced so that there can be obtained a metal sheet having a structure in which separated particles of the above layer are finely dispersed. The dispersed particles have a spherical form or an acicular form.

The metal sheet having a particle-dispersed structure due to the heat treatment is further hot rolled or cold rolled, whereby there can be also obtained a metal sheet whose structure becomes finer.

Generally, the metal material comes to have a finer structure as processing such as rolling or wire drawing is proceeded with. The present invention is directed to a method of stacking at least two kinds of thin sheets selected from pure metal thin sheets and alloy thin sheets alternately and bonding these sheets metallically to make a microstructure finer. Therefore, the step of stacking and the step of rolling are necessarily required. With an increase in the number of the above stacking and rolling steps, the thickness of each layer of the metal sheet becomes thinner and a structure of the metal sheet becomes finer, i.e., the grains become finer.

When the number of the pure metal thin sheets and/or the alloy thin sheets to be stacked is few, only small effect is obtained on the formation of a finer structure in one rolling step. When the procedures of stacking and rolling are repeated, the formation of a finer structure can be proceeded. For carrying out each stacking procedure, however, the steps of rolling, cutting, improvement of flatness, surface cleaning and welding are required. Therefore, an increase in the repetition of the stacking procedures causes an increase in the production cost. Industrially, it is preferred to stack at least ten sheets.

With an increase in the number of the sheets stacked, the formation of a finer structure proceeds further, and there is therefore no special upper limitation to be imposed on the number of the sheets to be stacked. Since, however, the above number increases to excess, the handling thereof comes to be difficult. It is, therefore, required to determine the number of the sheets to be stacked from the viewpoint of a required degree of the formation of a finer structure and working efficiency.

The thickness of a metal sheet after the first rolling procedure is also determined from the viewpoint of the degree of the formation of a finer structure and a working efficiency. The thickness of a metal sheet after the hot rolling is generally about 2 to 10 mm. It is advantageous in view of cost to clean the surfaces of the hot rolled metal sheets in this step, stack the cleaned metal sheets and carry out a second rolling procedure. However, when it is desired to advance the formation of a finer structure further, it is advantageous in some cases to carry out cold rolling after the hot rolling to form a metal sheet having a thickness of about 1 to 0.1 mm, and then, move to next stacking and rolling procedures.

There is a case in which the formation of a finer structure does not be sufficiently advance by only the repetition of stacking and rolling procedures depending on the kind of the pure metals or alloys. Further, some cases require a high degree of the formation of a finer structure.

In these cases, a heat treatment may be carried out nearly at a lower melting point in the melting points of the pure metal thin sheets and/or the alloy thin sheets, to form a finer structure and generate finely dispersed particles in a spherical form or an acicular form.

In particular, for controlling magnetic properties or toughness, etc., the formation of a further finer metal structure is required to proceed in some cases. In these cases, it is appropriate to carry out cold rolling after hot rolling to generate heterogeneous deformation inside a metal sheet, and then, carry out heat treatment.

As examples of a pure metal thin sheet, an iron sheet (Fe) and a copper sheet (Cu) will be explained more concretely hereinafter.

EMBODIMENTS OF PREFERRED APPLICATIONS

Iron having a copper content of 10 to 20% is used as a semihard magnetic material due to the effect of copper particles dispersed finely. Further, when the copper content is increased, it comes to be a material having both thermal conductivity and strength. However, the melting and casting of an alloy of iron and copper are difficult and hot rolling thereafter is also difficult so that the alloy of iron and copper becomes expensive and the production thereof as a commodity product is small. In the case of producing an alloy like above in the present invention, since a fine structure is required for a semihard magnetic material, copper sheets having a thickness of about 0.1 to 0.3 mm and iron sheets having a thickness of about 0.5 to 2 mm are stacked. The formation of a finer structure is not sufficient by one rolling so that 2 or 3 stacking and rolling procedures are carried out. On the other hand, in the case of preparing a material having both strength and thermal conductivity, it is not required to form a structure as fine as the semihard magnetic material so that it is sufficient to carry out stacking and rolling once.

The present invention will be explained with reference to Examples hereinafter, while the present invention shall not be limited by these Examples.

EXAMPLE 1

21 sheets of austenitic stainless steel, SUS304 (18Cr-8Ni), having a size of 0.5 mm×80 mm×200 mm and 20 sheets of ferritic stainless steel, SUS444 (low C-18Cr-2Mo), having the same size were alternately stacked. The circumference of the stack of the sheets was welded to integrate these. Then, the integrated sheets were heated to 1,150° C. and hot rolled to obtain a sheet having a thickness of 3 mm. The sheet was further cold rolled to obtain a sheet having a thickness of 1 mm. When measured for thermal expansion coefficient, it showed a thermal expansion coefficient of 13.8 in a range of 20° C. to 100° C. This value is about a middle value of the above-used stainless steels.

EXAMPLE 2

Low-carbon steel sheets having a thickness of 0.5 mm, a width of 70 mm and a length of 140 mm and copper sheets having the same width, the same length and a thickness of 0.1 mm were alternately stacked so as to have 117 layers in total. The stacked sheets were enclosed in a box made of iron having a height of 40 mm, a width of 80 mm and a length of 170 mm, as an outer size, by welding. The enclosed sheets were heated up to 1,000° C. and then hot rolled to obtain a stack material having a thickness of 3 mm. Further, the above 3 mm thick sheet was cut to obtain sheets having a length of 100 mm, and the cut sheets having a length of 100 mm were stacked to have 10 layers. The stacked sheets were enclosed in a box made of iron having a height of 30 mm, a width of 80 mm and a length of 130 mm as an outer size by welding, and hot rolled again to obtain a sheet thickness of 3 mm. Owing to the above procedures, there was obtained a material having a sheet thickness of 3 mm and having 1170 layers in which Fe and Cu were alternately stacked.

At this time, the thickness of a Fe layer was about 8.5 $\mu$m and the thickness of a Cu layer was 1.5 $\mu$m. The above rolled material was cold rolled to obtain a rolled sheet having a thickness of 0.5 mm. There was prepared a fine stacked material in which the thickness of a Fe layer was 0.5 μm and the thickness of a Cu layer was 0.1 μm and in which Fe and Cu were alternately stacked.

EXAMPLE 3

Pure iron sheets having a thickness of 5 mm, a width of 70 mm and a length of 140 mm and copper sheets having the same width, the same length and a thickness of 1 mm were alternately stacked so as to have 13 layers in total. The stacked sheets were enclosed in a box made of iron having a height of 40 mm, a width of 80 mm and a length of 170 mm as an outer size by welding. The enclosed sheets were heated up to 1,000° C. and then hot rolled to obtain a stack material having a sheet thickness of 2.3 mm (first stacking). At this time, the thickness of a Fe layer was about 0.28 mm, and the thickness of a Cu layer was 0.055 mm. Further, the thus-prepared 2.3 mm thick sheet was cut to obtain sheets having a length of 100 mm. The cut sheets were stacked to have 14 layers, and the thus-stacked sheets were enclosed in a box made of iron by welding. Similarly, hot rolling was carried out, to obtain a stack material having a thickness of 2.1 mm (second stacking). In this state, the total of the Fe layers and the Cu layers was 182 layers. The thickness of a Fe layer was 20 μm, and the thickness of a Cu layer was 4 μm. Further, 2.1 mm thick stack materials obtained in the second stacking were stacked to have 14 layers. Similarly, the stack having 14 layers was enclosed in a box made of iron by welding and hot rolling was carried out (third stacking). The thus-obtained stack material had a thickness of 2.6 mm. In the thus-obtained stack material, Fe layers and Cu layers were alternately stacked to have 2548 layers. The thickness of a Fe layer was 1.5 μm, and the thickness of a Cu layer was 0.3 μm.

The stack material obtained in the third stacking was cold rolled to have a thickness of 0.5 mm. In this state, copper layers were separated to have a Cu-particle finely dispersed structure. There was observed a structure in which Cu having a diameter of about 0.06 μm was dispersed in an acicular form in a Fe matrix. When the above material was measured for magnetic properties, it was found that the above material came to be a semihard magnetic material which had properties of a coercivity of 100 e and a residual magnetic flux density of 10 kG and showed properties of a hard magnetic material in contrast with the fact that the iron as a raw material was a soft magnetic substance.

EFFECT OF THE INVENTION

According to the present invention, a new developed metal sheet having desired combining functions can be easily obtained. The effect thereof is remarkable.

What is claimed is:

1. A process for the production of a metal sheet having a multi-layered structure of an iron layer and a copper layer and a fine composite structure, which process comprises stacking iron thin sheets and copper thin sheets alternately so as to have multiple layers having at least 10 layers in total, integrating the stacked sheets by circumferential welding or placing the stacked sheets in a steel or stainless steel box to integrate these, and then, bonding all the layers of the integrated sheets metallically by hot rolling.

2. The process according to claim 1, wherein cold rolling is further carried out after the hot rolling.

3. The process according to claim 1, which comprises further stacking the metal sheets having multiple layers, integrating the stacked metal sheets by circumferential welding or placing the stacked metal sheets in a steel or stainless steel box to integrate these, and then, bonding all the layers of the integrated metal sheets metallically by hot rolling.

4. The process according to claim 3, wherein cold rolling is further carried out after the hot rolling.

5. The process for the production of a metal sheet, which process comprises cold rolling the metal sheet recited in claim 1, and further heat-treating the cold rolled metal sheet at or about the melting point of copper to form a metal sheet having a structure in which particles of comer are dispersed.

6. The process according to claim 5, wherein the dispersed particles have a spherical form or an acicular form.

7. The process for the production of a metal sheet, which comprises further hot rolling or cold rolling the metal sheet having a particle-dispersed structure recited in claim 5.

* * * * *